United States Patent
Luukonen

Patent Number: 5,303,500
Date of Patent: Apr. 19, 1994

[54] ICE FISHING DEVICE

[76] Inventor: Leroy Luukonen, HCR 70, Box 173, LaPorte, Minn. 56461-9640

[21] Appl. No.: 54,681

[22] Filed: Apr. 28, 1993

[51] Int. Cl.$^5$ .............................................. A01K 97/00
[52] U.S. Cl. ...................................... 43/54.1; 43/55; 206/315.11; 220/23.83
[58] Field of Search ................... 43/54.1, 55, 56, 57.1; 206/315.11, 372, 373; 220/23.6, 23.83, 23.86, 735

[56] References Cited

U.S. PATENT DOCUMENTS

| | | | |
|---|---|---|---|
| 2,758,798 | 8/1956 | Schmidt | 206/373 |
| 3,452,469 | 7/1959 | White | 43/55 |
| 3,751,845 | 8/1973 | van Leeuwen | 43/56 |
| 3,966,102 | 6/1976 | Clark | 220/23.83 |
| 4,534,474 | 8/1985 | Ng | 220/23.86 |
| 4,765,472 | 8/1988 | Dent | 220/23.86 |
| 4,826,007 | 5/1989 | Skeie | 206/373 |
| 4,867,332 | 9/1989 | Mains | 206/373 |
| 4,911,295 | 3/1990 | Venegoni | 206/372 |
| 5,125,183 | 6/1992 | Tisdell | 43/54.1 |
| 5,174,447 | 12/1992 | Fleming | 220/23.83 |

Primary Examiner—Paula A. Bradley
Assistant Examiner—Chuck Y. Mah
Attorney, Agent, or Firm—Palmatier, Sjoquist & Helget

[57] ABSTRACT

This invention relates to a portable ice fishing device for use by ice fisherman. The invention includes a bucket for holding a plurality of stackable and/or removable trays. The trays may contain a plurality of dividers to separate various types of fishing gear. In addition, the trays may include compartments having lids for holding live bait, or open portions for carrying fishing related gear of increased size. At least one open portion has a bracket for holding an "LED" view screen of an electronic fish locating device. The invention has a cover which provides to an ice fisherman the ability to use the device as a seat/chair during ice fishing. The invention also includes an apron which may be affixed to the exterior of the device by a strap. The apron has an upper lip and a pocket for attaching ice fishing rods, ice ladles, fillet knives, and/or pliers to the exterior of the device, thereby providing for convenient access of these items to an individual.

19 Claims, 2 Drawing Sheets

ICE FISHING DEVICE

BACKGROUND OF THE INVENTION

Ice fishermen frequently carry a plurality of devices upon frozen lakes or rivers when engaging in ice fishing activities. A bucket is frequently used to carry various ice fishing gear, and is used as a seat during ice fishing. Ice fishing gear transported within a bucket frequently becomes entangled due to the lack of organization and separation of items. In addition, a bucket may not conveniently hold fishing items such as fishing lures, fish locators, fishing rods, and/or bait boxes for easy retrieval by an ice fisherman. No device is known which provides an ice fisherman with the ability to simultaneously transport, in an organized container, fishing lures, electronic fish locators, bait, fishing rods, ice ladles, fillet knives, pliers, scoops, and a seat for use during ice fishing. The present invention provides an organized carrier for these types of ice fishing equipment.

SUMMARY OF THE INVENTION

This invention relates to a portable ice fishing device for use by ice fisherman. The invention includes a bucket for holding a plurality of stackable and/or removable trays. The trays may contain a plurality of dividers to separate various types of fishing gear. In addition, the trays may include compartments having lids for holding live bait, or open portions for carrying fishing related gear of increased size. At least one open portion has a bracket for holding an "LED" view screen of an electronic fish locating device. The invention has a cover which provides to an ice fisherman the ability to use the device as a seat/chair during ice fishing. The invention also includes an apron which may be affixed to the exterior of the device by a strap. The apron has an upper lip and a pocket for attaching ice fishing rods, ice ladles, fillet knives, and/or pliers to the exterior of the device, thereby providing for convenient access of these items to an individual.

It is a principal object of the present invention to provide a new and improved organized winter ice fishing device of relatively simple and inexpensive design, construction and operation, which is safe and durable and which fulfills the intended purpose without fear of injury to persons and/or damage to ice fishing gear or equipment.

It is an object of the present invention to provide an ice fisherman with an organized winter ice fishing device for transportation of various types of fishing gear and fishing related equipment.

It is still another object of the present invention to provide a sturdy organized winter ice fishing device which is of sufficient strength to not fracture or break when used as a chair or seat by an ice fisherman.

It is still another object of the present invention to provide an ice fisherman with a single device for carrying of ice fishing equipment and ice fishing bait.

A feature of the present invention is a first tray having a plurality of first sectional dividers, a pair of interior second walls, and an arm bracket mechanism which is adapted for carrying fishing lures or fishing equipment, and an "LED" electronic fish locating device.

Another feature of the present invention is a second tray having an interior third wall, and a plurality of second sectional dividers for carrying ice fishing related equipment and fishing lures.

Still another feature of the present invention is a third tray having a fourth interior wall, a plurality of third sectional dividers, and a fifth interior wall defining a first compartment where the first compartment has a cover adapted for carrying bait by an ice fisherman.

Still another feature of the present invention is an apron having an outwardly extending ledge having a plurality of grooves and apertures therethrough adapted for carrying ice fishing equipment such as fishing rods, pliers, ice scoops, fillet knives, and/or minnow nets.

Still another feature of the present invention includes a strap which affixes the apron to the exterior of the ice fishing device.

Still another feature of the present invention includes a pocket attached to the lower portion of the apron for holding ice fishing rods in a fixed position relative to the exterior of the ice fishing device.

DETAILED SPECIFICATION OF THE PREFERRED EMBODIMENT

Figure 1:
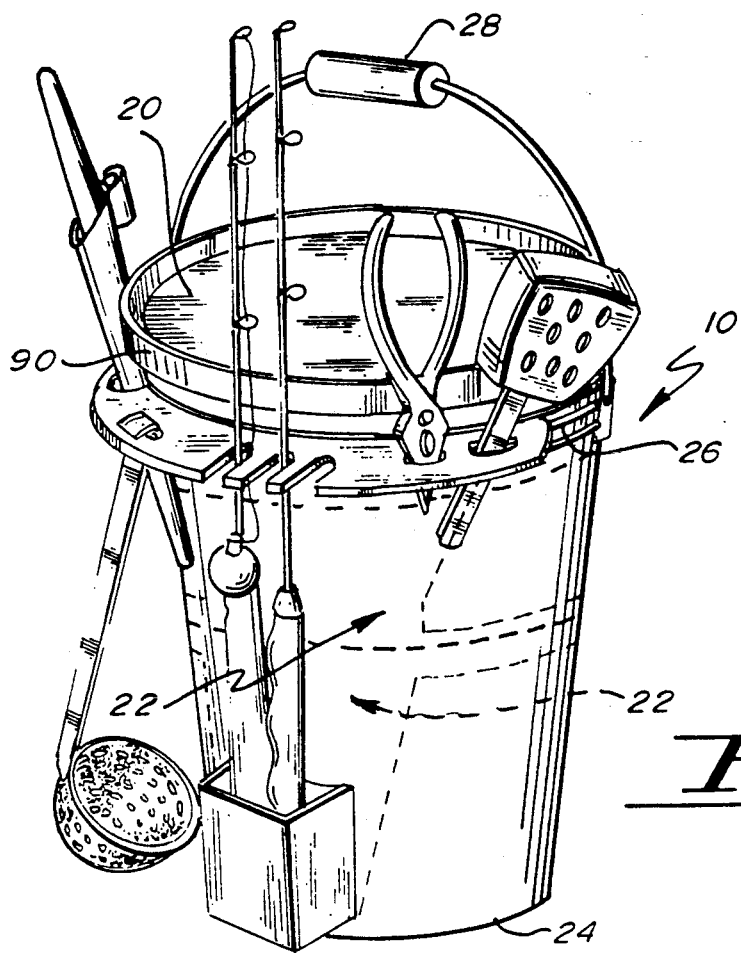
FIG. 1 is an isometric partial phantom line view of the invention.
Figure 2:
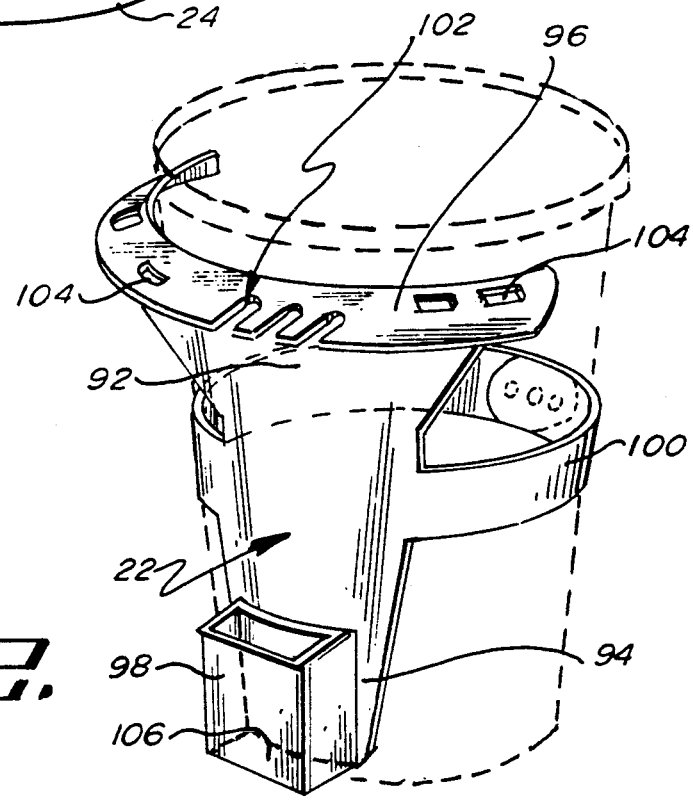
FIG. 2 is a detail view of the apron.
Figure 3:
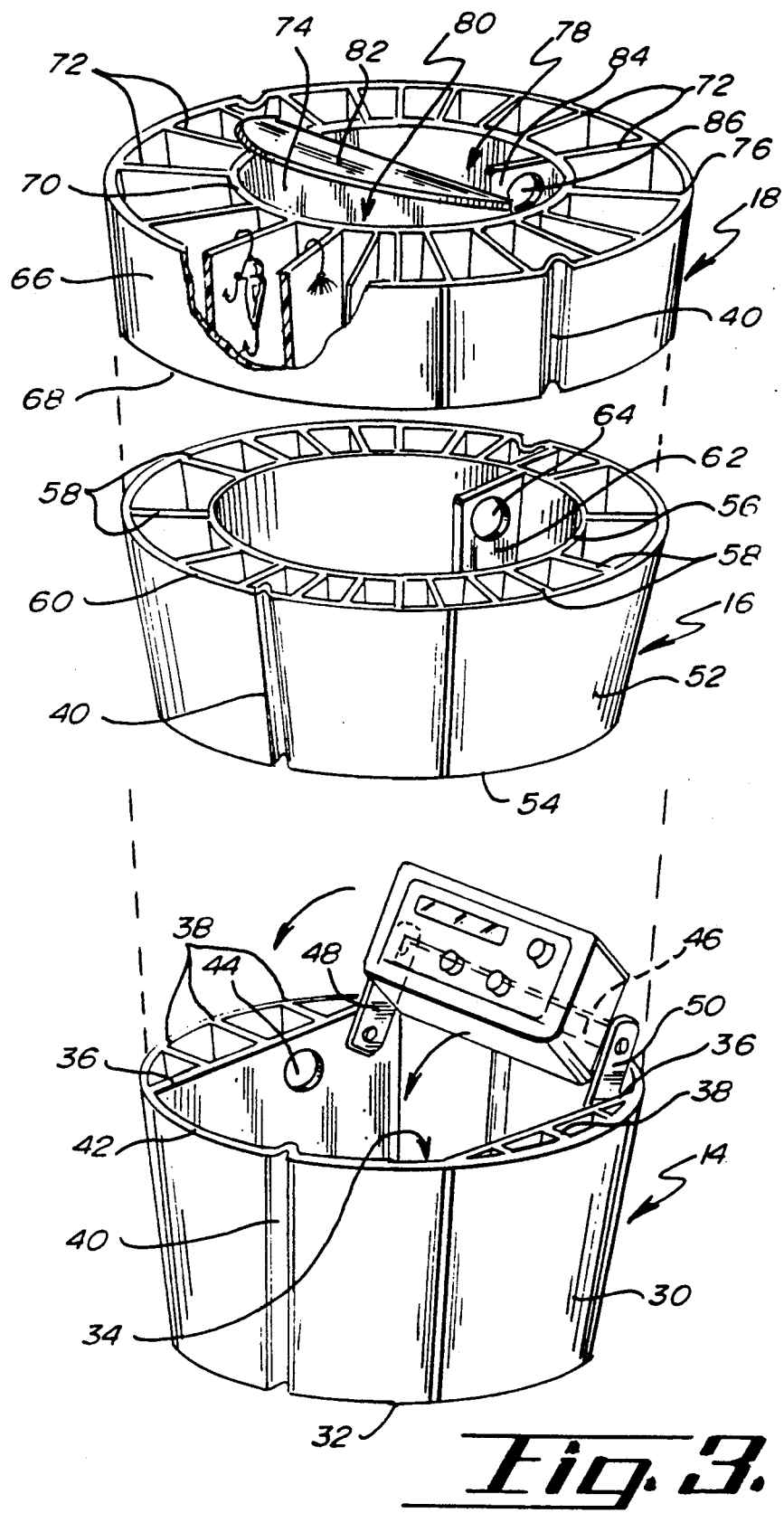
FIG. 3 is an exploded view of the plurality of trays found within the invention.

One form of the invention is illustrated and described herein. The ice fishing device is indicated in general by the numeral 10. The ice fishing device 10 includes a bucket 12, a first tray 14, a second tray 16, a third tray 18, a cover 20, and an apron 22.

The bucket 12 is generally molded of one-piece construction of plastic material and is generally cylindrical in shape for holding a six gallon capacity. The height and top diameter dimensions for the bucket 12 are preferably eighteen inches and twelve inches, respectively. The bucket 12 has a base 24. The bucket 12 may be tapered where the base 24 has a diameter dimension of approximately ten and one-half inches. The shape of the bucket 12 and the base 24 is not critical to the operation of the ice fishing device 10. The dimensions of the bucket 12 provided herein have been supplied for illustrative purposes and may be varied considerably provided that the essential features, functions, and attributes described herein are not sacrificed.

The bucket 12 may be formed of any preferred plastic, wood, fiberglass, and/or metal material at the preference of an individual. The bucket 12 generally is formed of a plastic material having a thickness of one-eighth inch which provides strength and durability preventing the fracture, cracking or breakage during the transportation of ice fishing related equipment or use of the bucket 12 by an individual as a seat during ice fishing activities.

The bucket 12 includes an interior, exterior, and an open top portion. A plurality of ridges 26 encircle the exterior top portion of the bucket 12. The apron 22 is affixed to the exterior of the bucket 12, and to the ridges 26, which prevents the apron 22 from sliding downward toward the base 24. The first, second, and third trays 14, 16 and 18, respectively, are located within the interior of the bucket 12 during transportation of ice fishing related equipment.

A handle 28 is pivotally affixed to the exterior of the bucket 12 proximal to the ridges 26. The handle 28 provides to an ice fisherman a convenient means for grasping the ice fishing device 10 during transportation of ice fishing gear. The exterior of the bucket 12 may be of any preferred color, or may be marked with any preferred design or logo, at the discretion of an individual or manufacturer.

The first tray 14 generally includes a first wall 30, a base 32, a first open portion 34, a pair of parallel second walls 36, and a plurality of first sectional dividers 38.

The first wall 30, base 32, and the pair of the parallel second walls 36 are generally molded of one-piece construction of sturdy and durable plastic material having a thickness dimension equal to one-eighth inch. The height, top diameter, and base diameter dimensions of the first tray 14 are eight inches, ten and three-quarter inches, and ten and one-quarter inches, respectively. The first tray 14 may be tapered providing for positioning within the interior of the bucket 12 such that the base 32 of the first tray 14 is in flush contact with the base 24 of the bucket 12. The first tray 14 may be formed of any preferred plastic, wood, fiberglass, and/or metal material at the preference of an individual so long as the essential features, functions, and attributes described herein are not sacrificed. The dimensions for the first tray 14 provided herein have been supplied for illustrative purposes and may be varied considerably provided the first tray 14 may be easily removed from the interior of the bucket 12.

The first wall 30 may contain a plurality of flutes 40 which extend vertically upward from the base 32 to the first upper edge 42. It should be noted that the base 32 and the first upper edge 42 are preferably circular in shape like the base 24 of the bucket 12. The shapes of the base 32 and the first upper edge 42 are not critical to the operation of the ice fishing device 10 so long as the shapes of the base 32 and the first upper edge 42 are identical to the shape of the bucket 12. It should be noted that the bucket 12 may be square or oval in shape at the preference of an individual.

The pair of parallel second walls 36 traverse the interior of the first tray 14 and are preferably molded to the first wall 30. The pair of parallel second walls 36 define the first open portion 34. The pair of parallel second walls 36 are preferably rectangular in shape and are flushly engaged to the interior of the first tray 14, and extend from a position proximal to the base 32 to the first upper edge 42.

A plurality of first sectional dividers 38 extend perpendicularly outward from the pair of parallel second walls 36 to the first wall 30. The plurality of first sectional dividers 38 define a plurality of vertical slots for holding fishing lures, bobbers, and/or other ice fishing related equipment or gear. The plurality of first sectional dividers 38 may be held in place by tabs positioned on each side of the first sectional dividers 38. The first sectional dividers 38 may then be removed, replaced, and/or placed into any desired configuration by an individual. The usefulness of the first tray 14 to an ice fisherman is thereby significantly enhanced. Alternatively, the first sectional dividers 38 may be fixedly positioned and attached to the first walls 30, and the corresponding second wall 36, by any preferred means including but not limited to use of adhesives and/or molding. The first sectional dividers 38 may alternatively be slidably positioned into aligned grooves milled into the interior of the first wall 30 and the side of the second walls 36 opposite to the first open portion 34. The method of attachment or affixation of the plurality of first sectional dividers 38 to the first tray 14 is not critical to the operation of the ice fishing device 10.

A first aperture 44 passes through one of the pair of parallel second walls 36 equal distances between two of the first sectional dividers 38. The first aperture 44 functions to provide an individual with the ability to grasp the first tray 14 for extraction from the interior of the bucket 12.

The purpose of the flutes 40 is to provide for the free flow of air between the first wall 30 and the interior of the bucket 12, thereby preventing an airtight or suction environment between the first tray 14 and the bucket 12. The size of the first tray 14 is fitted for close tolerance with the interior of the bucket 12. It should be noted that the convenient extraction and replacement of the first tray 14 within the bucket 12 is highly desirable to an ice fisherman.

The pair of parallel second walls 36 have a dual purpose of defining a barrier for the plurality of first sectional dividers 38 and defining the first open portion 34 of the first tray 14. As noted earlier, the plurality of first sectional dividers 38 are adapted for receiving engagement of fishing lures, bobbers, and/or other fishing equipment having a size of approximately eight inches or less in length. The purpose of the first open portion 34 is to hold and carry the battery and the "LED" indicator of an electronic fish locating device. The battery of the electronic fishing locating device rests upon the base 32 of the first tray 14 in the first open portion 34, between the pair of parallel second walls 36. The "LED" indicator of the electronic fish locating device is preferably affixed to a mounting bracket 46. The mounting bracket 46 is pivotally attached to, and extends between, a first arm member 48 and a second arm member 50. The first and second arm members 48 and 50 are each pivotally affixed to one of the pair of parallel second walls 36. The pivotal feature of the first and second arm members 48, 50, and the mounting bracket 46 permits an electronic fish locating device to be folded downward, into a compacted space saving position, within the first open portion 34 of the first tray 14 during transportation and storage of the ice fishing device.

The positioning and size of the pair of parallel second walls 36 and the plurality of first sectional dividers 38 may be suitably varied at the discretion of an individual to hold and carry any preferred make and manufacture of electronic fish locating devices.

During use of the ice fishing device 10, the first tray 14 may be extracted from the bucket 12 by grasping of the first aperture 44. The first tray 14 may then be placed upon a frozen surface where the transducer of the electronic fish locating device may then be positioned into the open water aperture through the frozen surface.

The second tray 16 generally includes a third wall 52, a base 54, a fourth wall 56, and a plurality of second sectional dividers 58.

The third wall 52, base 54, and the fourth wall 56 are generally molded of one-piece construction of sturdy and durable plastic material having a thickness dimension equal to one-eighth inch. The height, top diameter, and base diameter dimensions of the second tray 16 are five and one-eighth inches, eleven inches, and ten and one-half inches, respectively. The second tray 16 may be tapered providing for positioning within the interior of the bucket 12 such that the base 54 of the second tray 16 is in flush contact with the first upper edge 42 of the first tray 14 within the interior of the bucket 12. The second tray 16 may be formed of any preferred plastic, wood, fiberglass, and/or metal material at the preference of an individual so long as the essential features, functions, and attributes as described herein are not sacrificed. The dimensions of the second tray 16 provided herein have been furnished for illustrative purposes and may be varied considerably provided the base 54 of the second tray 16 may be suitably engaged to the first upper edge 42 of the first tray 14 within the interior of the bucket 12.

The third wall 52 may contain a plurality of a flutes 40 which extend vertically upward from the base 54 to the second upper edge 60. It should be noted that the base 54, the second upper edge 60, the third wall 52, and the fourth wall 56 are preferably circular in shape. The shape of the base 54, the second upper edge 60, the third wall 52, and the fourth wall 56 are not critical to the operation of the ice fishing device 10 so long as the shapes of the base 54, the second upper edge 60, the third wall 52, and the fourth wall 56 are identical to the shape of the bucket 12 and the first tray 14.

The fourth wall 56 is preferably centrally positioned within the interior of the second tray 16 and is spaced an equal distance from the third wall 52 over its entire circumference. The fourth wall 56 is preferably formed of plastic material having thickness and height dimensions equal to one-eighth inch and five inches, respectively. The fourth wall 56 is preferably molded to the base 54 of the second tray 16. The fourth wall 56 defines a central open portion for the second tray 16. The fourth wall 56 extends upward from the base 54 to the second upper edge 60.

A plurality of second sectional dividers 58 extend perpendicularly outward from the fourth wall 56 to the third wall 52. The plurality of second sectional dividers 58 define a plurality of vertical slots for holding fishing lures and other ice fishing related equipment. The plurality of second sectional dividers 58 may be held in place by tabs positioned on opposite sides of each second sectional dividers 58. The second sectional dividers 58 may then be removed, replaced, and/or placed into any desired configuration as desired by an individual. The usefulness of the second tray 16 to an ice fisherman is thereby significantly enhanced. Alternatively, the second sectional dividers 58 may be fixedly positioned and attached to the third and fourth walls 52, 56 by any preferred means including but not limited to the use of adhesives and/or molding. It should be noted that the plurality of second sectional dividers 58 extend vertically upward from the base 54 to a position level with the second upper edge 60. The plurality of second sectional dividers 58 may alternatively be slidably positioned into aligned grooves milled into the interior surface of the third wall 52 and the exterior surface of the fourth wall 58, which is opposite to the central open portion of the second tray 16. The method of attachment or affixation of the plurality of second sectional dividers 58 to the second tray 16 is not critical to the operation of the ice fishing device 10.

A first handle tab 62 is affixed to the interior of the fourth wall 56 within the open central portion of the second tray 16 The first handle tab 62 is preferably formed of plastic material having height, width, and thickness dimensions equal to five inches, two inches, and one-eighth inch, respectively. The first handle tab 62 is preferably rectangular in shape and is affixed to the fourth wall 56 by molding. The first handle tab 62 may be attached to the fourth wall 56 by any other preferred means including but not limited to the use of epoxy adhesives.

A second aperture 64 passes through the top central portion of the first handle tab 62. The second aperture 64 is used by an individual to extract and/or remove the second tray 16 from the interior of the bucket 12. The flutes 40 function to provide an air course which prevents an airtight seal and/or suction environment between the third wall 52 and the interior of the bucket 12. The size of the second tray 16 is maximized for close internal tolerance with the interior of the bucket 12. The extraction and replacement of the second tray 16 within the bucket 12 is highly desirable to an ice fisherman.

The fourth wall 56 has a dual purpose of defining a barrier for the plurality and second sectional dividers 58 and establishing a central open portion for the second tray 16. The central open portion of the second tray 16 may be used to hold and carry various ice fishing equipment in an organized and convenient manner.

The third tray 18 generally includes a fifth wall 66, a base 68, a sixth wall 70, a plurality of third sectional dividers 72, and a seventh wall 74.

The fifth wall 66, base 68, and sixth wall 70 are preferably molded of one-piece construction of sturdy and durable plastic material having a thickness dimensions of one-eighth inch. The height, top diameter, and base diameter dimensions of the third tray 18 are two and one-eighth inches, ten and seven-eighth inches, and ten and three-quarters inches, respectively. The third tray 18 may be tapered providing for positioning the base 68 of the third tray 18 upon, and in flush contact with, the second tray 16 within the interior of the bucket 12. The third tray 18 may be formed of any preferred plastic, wood, fiberglass, and/or metal material at the preference of an individual, so long as the essential features, functions, and attributes as described herein are not sacrificed. Dimensions of the third tray 18 provided herein have been furnished for illustrative purposes and may be varied considerably provided the base 68 of the third tray 18 may be positioned upon the second upper edge 60 of the second tray 16 within the interior of the bucket 12.

The fifth wall 66 may contain a plurality of flutes 40 which extend vertically upward from the base 68 to the third upper edge 76. It should be noted that the base 68, the third upper edge 76, the fifth wall 66, and the sixth wall 70 are preferably circular in shape. The shape of the base 68, the third upper edge 76, the fifth wall 66, and the sixth wall 70 are not critical to the operation of the ice fishing device 10 so long as the shapes of the base 68, the third upper edge 76, the fifth wall 66, and the sixth wall 70 are identical to the shape of the bucket 12, the first tray 14, and the second tray 16.

The sixth wall 70 is preferably centrally positioned within the interior of the third tray 18 and is spaced an equal distance from the fifth wall 66 over its entire circumference. The sixth wall 70 is preferably formed of plastic material having thickness and height dimensions equal to one-eighth inch and two and one-eighth inches, respectively. The sixth wall 70 is preferably molded to the base 68 of the third tray 18. The sixth wall 70 defines a second open portion 78 for the third tray 18. The sixth wall 70 extends upward from the base 68 to a level equal to the third upper edge 76.

A plurality of third sectional dividers 72 extend perpendicularly outward from the sixth wall 70 to the fifth wall 66. The plurality of third sectional dividers 72 define a plurality of vertical slots for holding fishing lures and other ice fishing related equipment. The plurality of third sectional dividers 72 may be held in place by tabs positioned on opposite sides of the third sectional dividers 72. The third sectional dividers 72 may be removed, replaced and/or positioned into any desired configuration by an individual. The usefulness of the third tray 18 to a fisherman is thereby significantly enhanced. Alternatively, the third sectional dividers 72 may be fixedly positioned and attached to the fifth and sixth walls 66, 70 by any preferred means including but not limited to the use of adhesives and/or molding. It should be noted that the plurality of third sectional dividers 72 extend vertically from the base 68 to a position level with the third upper edge 76. The plurality of third sectional dividers 72 may alternatively be slidably positioned in aligned grooves which are milled into the interior surface of the fifth wall 66 and the exterior surface of the sixth wall 70, which is opposite to the second open portion 78. The method of attachment or affixation of the plurality of third sectional dividers 72 to the third tray 18 is not critical to the operation of the ice fishing device 10.

The seventh wall 74 is preferably affixed to the sixth wall 70 centrally traversing and dividing the second open portion 78 into two equally sized portions, where one of the portions is defined as the first compartment 80. The seventh wall 74 is preferably formed of plastic material having thickness, height, and length dimensions equal to one-eighth inch, two and one-eighth inches, and six and three-eighth inches, respectively. The seventh wall 74 is preferably molded to the base 68 and to the interior of the sixth wall 70. The seventh wall 74 extends vertically upward from the base 68 to a level equal to the third upper edge 76.

A semicircular shaped lid 82 is affixed to the seventh wall 74. The lid 82 pivotally encloses the first compartment 80 of the third tray 18. The lid 82 is preferably pivotally affixed to the seventh wall 74 by a hinge. Alternatively, the lid 82 may be attached to the seventh wall 74 by a pliable tab. Alternatively, the lid 82 may be vertically and complete disengaged from a covering relationship over the first compartment 80.

The purpose of the seventh wall 74 is to define the first compartment 80. The first compartment 80 and the lid 82 are preferably moisture sealed preventing seepage or leakage of water into the second open portion 78 or into the plurality of slots, defined by the third sectional dividers 72. The first compartment 80 preferably functions as the area for transportation of live bait by an ice fisherman within the interior of the bucket 12. The first compartment 80 may be insulated to protect transported live bait from extreme winter weather conditions which may cause the bait to perish.

A second handle tab 84 is affixed to the interior of the sixth wall 70 within the second open portion 78 of the third tray 18. The second handle tab 84 is preferably formed of plastic material have height, width and thickness dimensions equal to two inches, one and three-quarters inches, and one-eighth inch, respectively. The second handle tab 84 is preferably rectangular in shape is affixed to the sixth wall 70 by molding. The second handle tab 84 may be attached to the sixth wall 70 by any preferred means including but not limited to the use of epoxy adhesives. The second handle tab 84 is positioned exterior to the first compartment 80.

A third aperture 86 passes through the top central portion of the second handle tab 84. The third aperture 86 is used by an individual to extract and/or remove the third tray 18 from the interior of the bucket 12. The flutes 40 function to provide an air course which prevents an airtight seal and/or suction environment between the fifth wall 66 and the interior of the bucket 12.

The size of the third tray 18 is maximized for close internal tolerance with the interior of the bucket 12. The extraction and replacement of the third tray 18 within the bucket 12 is highly desirable to an ice fisherman.

The sixth wall 70 has a dual purpose of defining a barrier for the plurality of third sectional dividers 72 and establishing the second open portion 78 for the third tray 18. The second open portion 78 of the third tray 18 may be used to hold and carry various ice fishing equipment in an organized and convenient manner.

During use of the ice fishing device 10, the base 68 of the third tray 18 preferably rests upon the second upper edge 60 of the second tray 16. The base 54 of the second tray 16 preferably rests upon the first upper edge 42 of the first tray 14, and the base 32 of the first tray 14 rests upon the base 24 of the interior of the bucket 12.

The first, second, and third trays 14, 16 and 18, respectively, provide to an ice fisherman a simple, durable, and organized system for transportation of ice fishing equipment. An organized device for transporting ice fishing gear is extremely useful to an ice fisherman, especially when the ice fisherman is required to simultaneously transport and ice auger for creating an opening through the ice.

The cover 20 preferably includes a circular flat surface and a circular lip portion 90. The lip portion 90 is preferably engaged to the exterior of the top portion of the bucket 12 above the ridges 26. The diameter dimension of the cover 20 is preferably 12 inches. The cover 20 is preferably of one-piece construction and is molded of plastic material having a thickness dimension of one-eighth inch. The cover 20 may be releasably attached to the top portion of the bucket 12 by the snap engagement of the lip 90 to the top exterior of the bucket 12. The cover 20 is of sufficient strength and durability to not crack, fracture, and/or break if used by an ice fisherman as a seat or chair during ice fishing activities.

The purpose of the cover 20 is to maintain the first, second and third trays 14, 16, and 18, respectively, within the interior of the bucket 12 during transportation of ice fishing gear. The cover 20, when affixed to the bucket 12, creates a moisture-tight seal which shields live bait and transported equipment from exposure to harsh winter weather conditions. It should be noted that the cover 20 does not affect the pivotal engagement of the handle 28 to the bucket 12. It should also be noted that the cover 20 assists in maintaining transported ice fishing equipment in an organized fashion even if the bucket 12 becomes tipped or loses its normal upright configuration.

The apron 22 is generally formed of a body having an upper portion 92, a lower portion 94, a ledge 96, a pocket 98, and a strap 100.

The apron 22 is generally of one piece construction and is molded of plastic material. The apron 22 is generally of a concave shape for flush engagement to the exterior of the bucket 12. The apron 22 may be formed of any preferred plastic, fiberglass, and/or metal material at the preference of an individual so long as the essential features, functions, and attributes described herein are not sacrificed.

The length dimensions for the upper portion 92, lower portion 94, and the height and average width dimensions for the apron 22 are sixteen inches, three and one-half inches, fifteen and one-half inches, and eight inches, respectively. The dimensions of the apron 22 provided herein have been supplied for illustrative purposes and may be varied considerably provided the apron 22 may be flushly engaged to the exterior of the bucket 12.

The upper portion 92 of the apron 22 is flushly engaged to the top portion of the exterior of the bucket 12. The ledge 96 is preferably positioned between two ridges 26 preventing the downward sliding of the apron 22 with respect to the bucket 12. The ledge 96 extends perpendicularly outward from the upper portion 92 and is formed of one-eighth inch thick sturdy plastic material. The ledge 96 is preferably molded to the upper portion 92 of the apron 22. The ledge 96 may alternatively be affixed to the upper portion 92 of the apron 22 by any preferred means including but not limited to the use of epoxy adhesives, provided the engagement between the ledge 96 and upper portion 92 is of sufficient strength and durability to not separate and fail during use of the ice fishing device 10.

The ledge 96 contains a plurality of grooves 102 and apertures 104 therethrough. The ledge 96 functions to hold various ice fishing equipment to the exterior of the bucket 12, including but not limited to ice fishing rods, ice ladles, pliers, minnow nets, and/or fillet knives. It should be noted that the grooves 102 may be lined with a foam padding for engagement to ice fishing rods. It should also be noted that the apertures 104 may be of the same or different sizes for receiving engagement of a variety of sized ice fishing apparatus.

The lower portion 94 of the apron 22 is flushly engaged to the bottom portion of the exterior of the bucket 12 proximal to the base 24. The pocket 98 is centrally affixed to the lower portion 94 extending perpendicularly outward therefrom. The pocket 98 includes a base 106 which supports the handles of ice fishing rods during engagement to, and the transportation of, the ice fishing device 10.

The pocket 98 is formed of one-eighth inch thick sturdy plastic material. The pocket 98 is preferably molded to the lower portion 94 of the apron 22. The pocket 98 may alternatively be affixed to the lower portion 94 of the apron 22 by any preferred means including but not limited to the use of epoxy adhesives, provided the engagement between the pocket 98 and the lower portion 94 is of sufficient strength and durability to not separate or fail during use of the ice fishing device 10.

The strap 100 is centrally positioned between the upper and lower portions 92 and 94, respectively. The strap 100 encircles the exterior of the bucket 12 securing the apron 22 to the ice fishing device 10. The strap 100 may be molded to the body of the apron 22, or the strap 100 may be affixed to the apron 22 by the use of looped and stitched webbed material through a pair of aligned slots. The strap 100 may be secured around the bucket 12 by the use of adjustable penetrating and receiving tabs or by the use of buckles at the discretion of an individual. In the preferred embodiment, the strap 100 is molded to, and is formed of the one same one-eighth inch thick plastic material as the apron 22. The strap 100 may then be secured around the bucket 12 by the use of penetrating and receiving tab members. The method employed for securing the strap 100 around the exterior of the bucket 12, whether by use of penetrating and receiving tab members or buckles, is not critical to operation of the ice fishing device 10.

During use of the ice fishing device 10, a plurality of ice fishing rods may be attached to the apron 22. The handles of the fishing rods are preferably positioned within the pocket 98 for resting engagement upon the base 106. The central portion of the fishing rods are then preferably positioned within one of the plurality of grooves 102 during transportation of the ice fishing device 10. It should be noted that transportation of ice fishing related equipment by engagement to the apron 22 does not affect the engagement of the cover 20 to the bucket 12 or the pivotal engagement of the handle 28 to the bucket 12. The apron 22 significantly enhances the utility of the ice fishing device 10 by providing to an ice fisherman the ability to attach and transport a variety of sized ice fishing related equipment to the exterior and interior of the ice fishing device 10. Large or lengthy ice fishing gear may then be transported by attachment to the exterior of the bucket 12 by engagement to the apron 22. Small ice fishing related equipment may be transported within either the first, second, or third trays 14, 16 or 18 within the interior of the bucket 12. An extremely versatile and useful ice fishing device 10 is thereby provided for use by an ice fisherman.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. An ice fishing device for carrying ice fishing apparatus comprising:
   (a) a bucket having a base, an interior, and a handle;
   (b) a plurality of trays for positioning within said interior of said bucket, each of said trays having a base, an exterior first wall, at least one interior second wall, and a plurality of sectional dividers extending between said exterior first walls and said interior second walls;
   (c) a cover removably affixed to said bucket; and
   (d) an apron affixed to said bucket comprising:
      (i) a body having an adjustable strap for encircling said bucket;
      (ii) a ledge extending outwardly from said body, said ledge having a plurality of grooves and apertures therethrough; and
      (iii) a pocket extending outwardly from said body where said ledge and said pocket carry said ice fishing apparatus.

2. An ice fishing device comprising:
   (a) a bucket having a base, an interior, an exterior, an open top portion, and a handle affixed to said open top portion of said exterior of said bucket;
   (b) a plurality of trays for positioning within said interior of said bucket, each of said trays having a base, an exterior first wall and at least one interior second wall, each of said exterior first walls having a plurality of flutes, each of said plurality of trays further having a plurality of sectional dividers extending between said exterior first walls and said interior second walls;

(c) a cover removably affixed to said top portion of said bucket; and
(d) an apron affixed to said exterior of said bucket, said apron comprising:
  (i) a body having an adjustable strap for encircling said bucket;
  (ii) a ledge extending outwardly from said body, said ledge having a plurality of apertures therethrough and a plurality of grooves; and
  (iii) a pocket extending outwardly from said body.

3. The ice fishing device according to claim 2, wherein one of said plurality of trays is defined as a first tray further comprising:
(a) a pair of parallel interior second walls which define a first open portion;
(b) a first aperture through one of said pair of parallel second walls;
(c) a first arm pivotally attached to one of said pair of parallel second walls;
(d) a second arm pivotally attached to the other of said pair of said parallel second walls; and
(e) a mounting bracket pivotally attached to, and extending between, said first and second arms.

4. The ice fishing device according to claim 3, wherein said base of said first tray is positioned proximal to said base of said bucket.

5. The ice fishing device according to claim 2, wherein one of said plurality of trays is defined as a second tray having a single interior second wall defining a second central open portion.

6. The ice fishing device according to claim 5, wherein said second tray has a first tab handle having a second aperture therethrough affixed to said interior second wall extending into said second central open portion.

7. The ice fishing device according to claim 6, wherein said second tray is positioned above one of said plurality of trays.

8. The ice fishing device according to claim 6, wherein said second tray is positioned between two of said plurality of trays.

9. The ice fishing device according to claim 2, wherein one of said plurality of trays is defined as a third tray having a single interior second wall defining a third central open portion.

10. The ice fishing device according to claim 9, wherein said ice fishing device further comprises a third interior wall engaged to said interior second wall traversing said third central open portion defining a first compartment.

11. The ice fishing device according to claim 10, wherein said ice fishing device further comprises a lid pivotally attached to said third interior wall for releasably covering said first compartment.

12. The ice fishing device according to claim 11, wherein said third tray has a second tab handle having a third aperture therethrough, said second tab handle being affixed to said interior second wall extending toward said third interior wall exterior of said first compartment.

13. The ice fishing device according to claim 12, wherein said third tray is positioned above at least one of said plurality of trays.

14. The ice fishing device according to claim 2, wherein said exterior first walls and said interior second walls are circular in shape.

15. The ice fishing device according to claim 3, wherein said pair of parallel interior second walls are rectangular in shape.

16. The ice fishing device according to claim 10, wherein said third interior wall is rectangular in shape.

17. The ice fishing device according to claim 10, wherein first compartment is semicircular in shape.

18. The ice fishing device according to claim 2, wherein said ledge of said apron is positioned proximal to said open top portion of said exterior of said bucket and said pocket is positioned proximal to said base of said bucket.

19. An ice fishing device comprising:
(a) a bucket having a base, an interior, an exterior, an open top portion positioned opposite to said base, and a handle affixed to said top portion of said exterior of said bucket;
(b) a first tray defined by a base and a first wall, said first wall having an exterior having a plurality of flutes, said first tray having an interior, a pair of parallel second walls traversing said interior defining a first open portion, a first aperture through one of said of pair of parallel second walls, a plurality of first sectional dividers extending between said pair of parallel second walls and said first wall, a first arm pivotally attached to one of said pair of parallel second walls, a second arm pivotally attached to the other of said pair of parallel second walls, and a mounting bracket pivotally attached to, and extending between, said first and second arms, said first tray adapted for positioning within said interior of said bucket where said base of said first tray is proximal to said base of said bucket;
(c) a second tray defined by a base and a third wall, said third wall having an exterior having a plurality of flutes, said second tray having an interior and a fourth wall, a plurality of second sectional dividers extending between said fourth wall and said third wall, a first handle tab having a second aperture therethrough affixed to said fourth wall opposite to said second sectional dividers within said interior of said second tray, said second tray adapted for positioning within said interior of said bucket where said base of said second tray is proximal to said first tray;
(d) a third tray defined by a base and a fifth wall, said fifth wall having an exterior having a plurality of flutes, said third tray having an interior and a sixth wall, a plurality of third section dividers extending between said sixth wall and said fifth wall, a seventh wall traversing said sixth wall defining a first compartment and a second open portion, a cover pivotally affixed to said seventh wall enclosing said first compartment, and a second handle tab having a third aperture therethrough affixed to said sixth wall extending into said second open portion, said third tray adapted for positioning within said interior of said bucket where said base of said third tray is proximal to said second tray;
(e) a cover removably affixed to said top portion of said bucket; and
(f) an apron affixed to said exterior of said bucket, said apron comprising:
  (i) a body having an upper portion, a lower portion, and an adjustable strap for encircling said exterior of said bucket;
  (ii) a ledge extending outwardly from said upper portion of said body, said ledge having a plurality of grooves and a plurality of fourth apertures therethrough; and
  (iii) a pocket extending outwardly from said lower portion of said body.

* * * * *

UNITED STATES PATENT AND TRADEMARK OFFICE
CERTIFICATE OF CORRECTION

PATENT NO. : 5,303,500
DATED : April 19, 1994
INVENTOR(S) : Leroy Luukkonen

It is certified that error appears in the above-indentified patent and that said Letters Patent is hereby corrected as shown below:

On the Title Page, Item [75], change the inventor's to read
—Luukkonen—.

Signed and Sealed this

Thirtieth Day of August, 1994

Attest:

BRUCE LEHMAN

Attesting Officer     Commissioner of Patents and Trademarks